(12) United States Patent
Mazzocchi et al.

(10) Patent No.: US 7,887,087 B2
(45) Date of Patent: Feb. 15, 2011

(54) ENERGY ABSORBENT HINGE FOR AN AIR BAG DEPLOYMENT DOOR

(75) Inventors: Nicholas A. Mazzocchi, Canton, MI (US); Kenneth J. Kwasnik, Shelby Township, MI (US); Brian C. Slane, Flat Rock, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 156 days.

(21) Appl. No.: 12/264,297

(22) Filed: Nov. 4, 2008

(65) Prior Publication Data

US 2010/0109296 A1 May 6, 2010

(51) Int. Cl.
*B60R 21/215* (2006.01)
(52) U.S. Cl. .................... 280/728.3; 280/732
(58) Field of Classification Search .......... 280/728.3, 280/732, 730.1
See application file for complete search history.

(56) References Cited

U.S. PATENT DOCUMENTS

| | | | |
|---|---|---|---|
| 5,382,047 A * | 1/1995 | Gajewski ............. 280/728.3 |
| 6,076,851 A | 6/2000 | Davis, Jr. et al. |
| 6,145,871 A | 11/2000 | Davis, Jr. et al. |
| 6,250,669 B1 * | 6/2001 | Ohmiya ................ 280/732 |
| 6,467,801 B1 * | 10/2002 | Preisler et al. ......... 280/728.3 |
| 6,595,543 B2 * | 7/2003 | Desprez ............... 280/728.3 |
| 7,007,970 B2 | 3/2006 | Yasuda et al. |
| 7,093,849 B2 | 8/2006 | Nishimima et al. |
| 7,178,825 B2 * | 2/2007 | Fujii et al. ............ 280/728.3 |
| 7,210,700 B2 * | 5/2007 | Zagrodnick et al. ...... 280/728.3 |
| 7,229,095 B2 * | 6/2007 | Nishijima et al. ........ 280/732 |
| 7,490,850 B2 * | 2/2009 | Kanno ................. 280/728.3 |
| 2003/0085555 A1 * | 5/2003 | Segura ............... 280/728.3 |
| 2006/0131844 A1 * | 6/2006 | Trevino et al. ......... 280/728.3 |

* cited by examiner

*Primary Examiner*—Paul N Dickson
*Assistant Examiner*—Timothy D Wilhelm

(57) ABSTRACT

An integrated air bag support structure that functions to dissipate excessive energy from a door panel during air bag deployment includes a support base configured to surround a door support panel. An air bag chute tube extends downward from the support base and contains a plurality of skirt walls. The door support panel separated from the support base by a gap on all four sides. A hinge element extends between one of the skirt walls of the air bag chute tube and one edge of the door support panel, and includes a plurality of pivoting elements and an arm extension to absorb energy during deployment.

7 Claims, 3 Drawing Sheets

ENERGY ABSORBENT HINGE FOR AN AIR BAG DEPLOYMENT DOOR

CROSS-REFERENCE TO RELATED APPLICATIONS

This application is related to the commonly assigned application Ser. No. 12/264304, filed Nov. 4, 2008, and entitled "AIR BAG DEPLOYMENT CHUTE."

BACKGROUND OF THE INVENTION

1. Field of the Invention

This invention relates to the field of air bag deployment systems for an automotive vehicle and more particularly to the area of a door support panel structure that has an energy absorbent hinge formed integral with an air bag chute.

2. Description of the Related Art

In this technology field, there have been several attempts to provide a passenger air bag chute with a deployment door hinge that is an integral part of the underlying support structure.

U.S. Pat. No. 6,076,851 describes an air bag deployment chute assembly for the passenger side of an instrument panel of a vehicle. An air bag support assembly is described as having an outer rim, a support structure, a door flap and a hinge member. The hinge member is connected between the door flap and the outer rim of the support assembly that is attached to the underside of the instrument panel.

U.S. Pat. No. 6,467,801 describes an air bag deployment chute similar to that in the '851 patent, and also shows a hinge member that is attached between the door and the base reinforcement portion that surrounds the door.

U.S. Pat. No. 7,178,825 describes an air bag deployment door in which the hinge is configured to extend upwardly from the upper portion of a back up member that is attached to the underside of an instrument panel. The back up member includes a back up section, that is integrally formed with a door plate section, and a hinge. The hinge is formed with a dual curved configuration that allows the hinge to straighten out ("first and second curve portions of the hinge section are each extended") as the air bag is deployed.

BRIEF SUMMARY OF THE INVENTION

The inventive concept is directed to an improved method and apparatus for use in an air bag deployment system that employs an air bag deployment structure formed to manage (partially dissipate) the deployment forces applied to the cover door in such a way as to allow minimum resistance to the air bag as it is being deployed, while controlling the opening action of the cover door and prevent its separation from the hinge.

The inventive concept includes an integrated structure with a support base for attachment to the rear side of a substrate. The support base is configured to surround a door support panel for attachment to the rear side of the substrate in an area that is pre-weakened to define an air bag deployment door in a vehicle instrument panel or a steering wheel air bag module. An air bag chute tube extends downward from the support base and contains a plurality of skirt walls for surrounding an air bag container and to define the path for deployment of the air bag from beneath the substrate. The door support panel is generally co-planar with the support base when attached to the substrate, but is separated from the support base by a gap on all four sides. A hinge element extends between one of the skirt walls of the air bag chute tube and one edge of the door support panel, and includes a pair of pivoting elements and an arm extension. A first pivoting element is formed with a downwardly directed curve having one end connected to the inner side of one of the skirt walls and the other end connected to the second pivot element. The second pivot element is formed with an upwardly directed curve having one end connected to the first pivot element and the other end connected to an extension arm that extends upwards to the edge of the door support panel.

During deployment of the associated air bag, the integrated structure allows energy forces presented to the door support panel to be partially dissipated into the structure via the hinge element. The result being that the dissipated forces are absorbed by the integrated structure which in turn causes the skirt wall, to which the hinge element is attached, to deform inwards towards the air bag container.

Therefore, it is an object of the inventive concept to provide an improved energy management method and system for an air bag deployment system that reduces the energy present on the door member during air bag deployment.

It is another object of the inventive concept to provide an improved hinge element for an air bag support structure that is configured to extend from a side wall of an air bag chute in such a way as to transfer energy from the door to the sidewall of the chute.

It is a further object of the inventive concept to provide an integrated structure that embodies the claimed features.

A more complete description of an embodiment of the inventive concept is presented below.

DETAILED DESCRIPTION OF THE INVENTION

Figure 1:
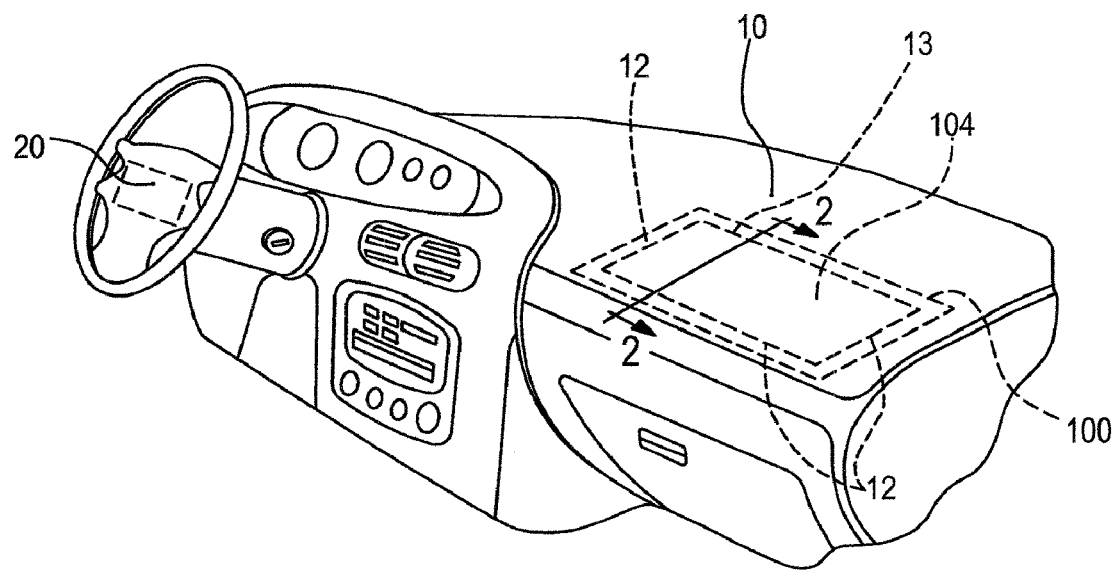
FIG. 1 is a perspective view of a vehicle instrument panel illustrating air bag deployment areas.

FIG. 1 represents a typical vehicle instrument panel 10 into which the inventive concept is to be installed. Additionally, the inventive concept is suitable for inclusion in a steering wheel air bag module 20.

The air bag deployment structure 100 is represented by a support base 101 for shown as being attached to the lower surface of a substrate that forms part of the instrument panel 10. A door support panel 104 is shown as also attached to the lower surface of the substrate, but positioned below an air bag deployment door that is defined by pre-weakened door seam 12 and hinge seam 13.

Figure 2:
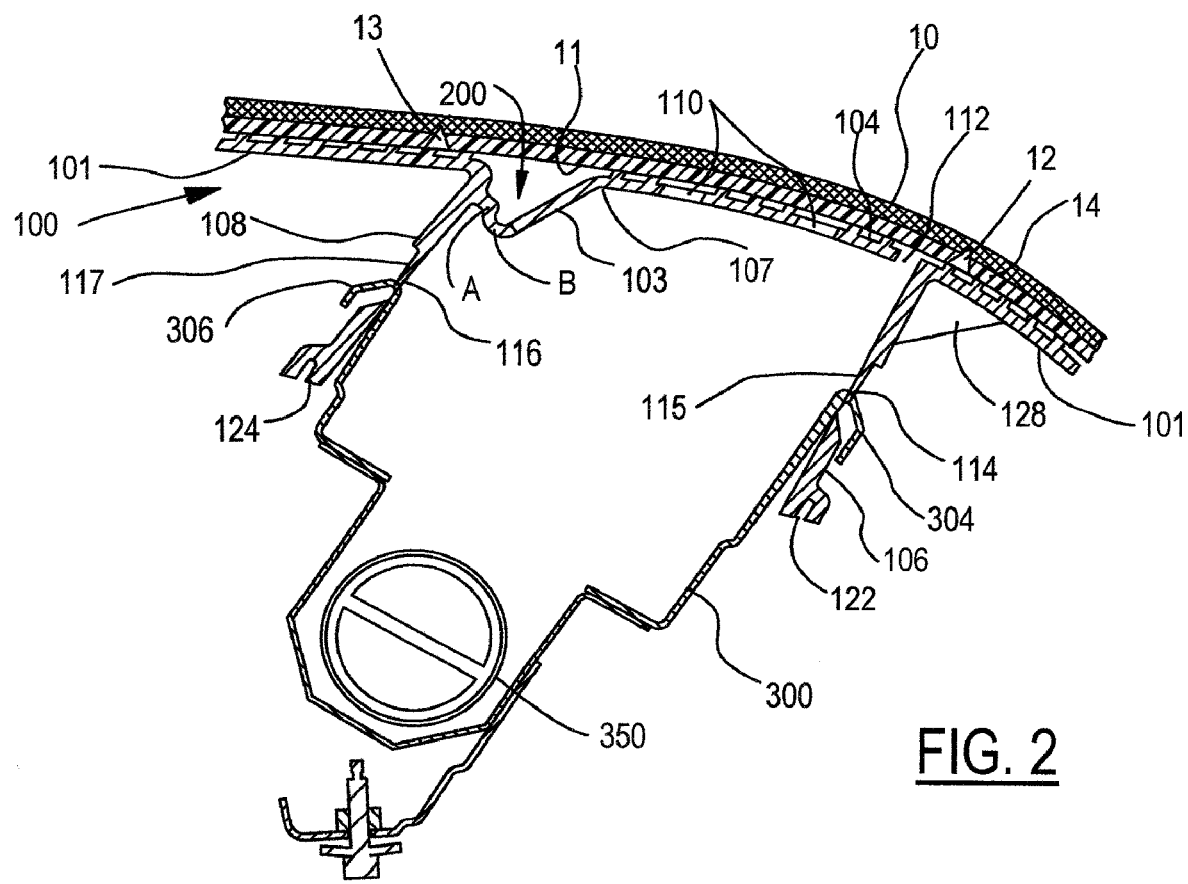
FIG. 2 is a cross-sectional view of an embodiment of the inventive concept connected to a substrate with an air bag container assembly.
Figure 3:
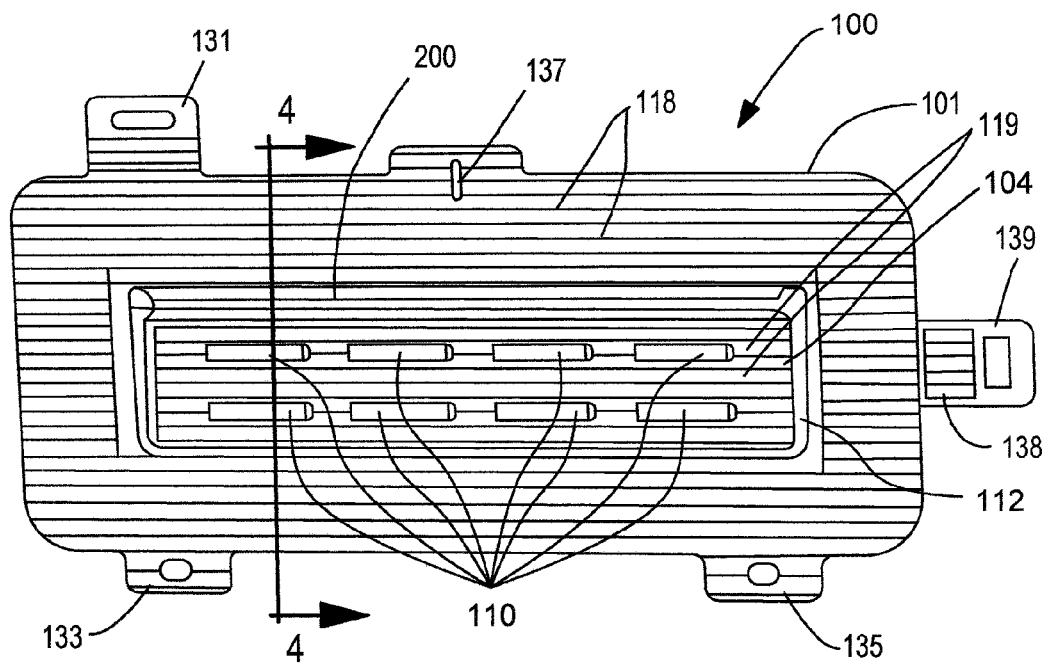
FIG. 3 is a top plan view of an embodiment of the inventive concept prior to installation in a vehicle air bag deployment system.
Figure 4:
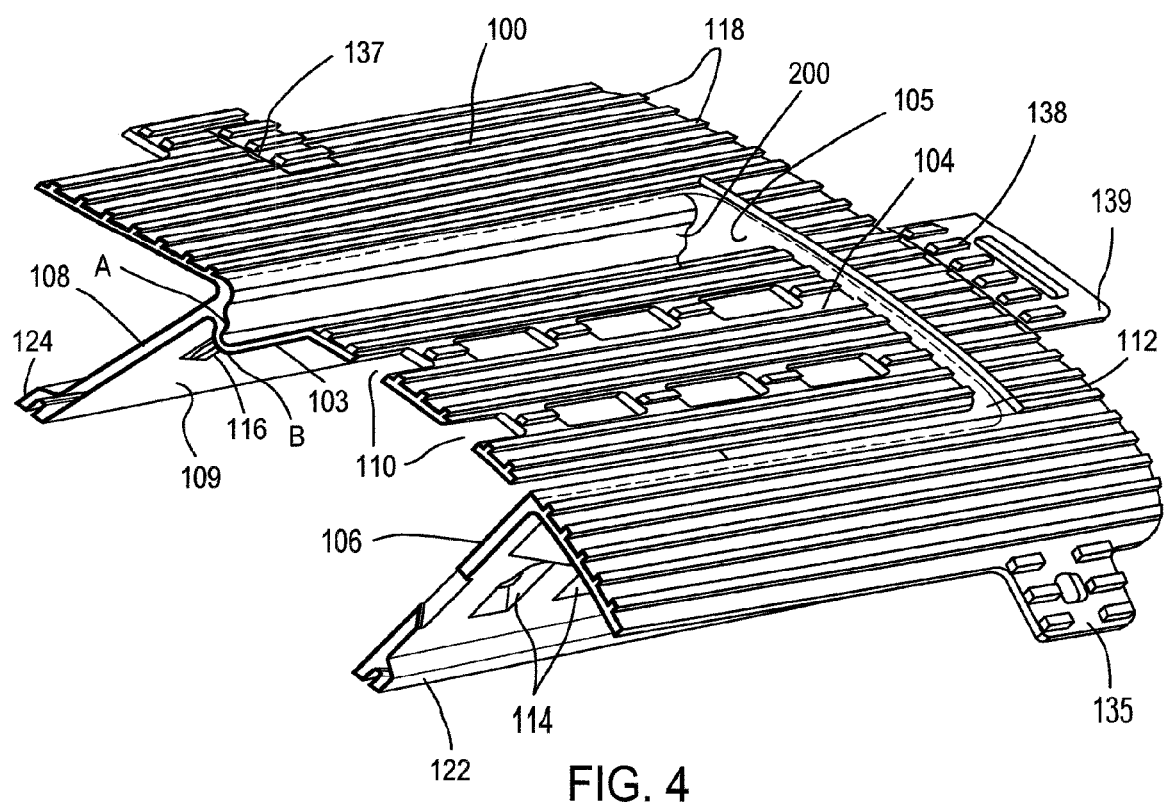
FIG. 4 is a cross-sectional perspective view taken along section line 4-4 in FIG. 3

In FIGS. 2, 3 and 4, the support base 101 is shown to have upper and lower surfaces. The upper surface of support base 101 contains a plurality of welding ribs 118 to facilitate attachment to the lower surface 11 of substrate 14 with a vibration welding process. (Of course other types of attachment such as ultrasonic welding, adhesives and other commonly known techniques may be acceptable substitutes, provided they preserve the energy absorbing characteristics described herein.) A door support panel 104, also containing welding ribs, is attached to the lower surface 11 of substrate 14 within an area defined as the air bag deployment door by the pre-weakened seams 12 and 13. In this configuration, the door tear seam 12 is pre-weakened to the extent that the outer surface of instrument panel 10 and the substrate 14 will completely rupture upon deployment of the air bag. Seam 13 is a hinge seam and is only required to provide a pivot point for the substrate and outer skin of the instrument panel 10. Therefore it may be pre-weakened to a lesser extent than door seam 12.

The air bag deployment structure 100 is formed as a one piece molding of a flexible material such as Dexflex™ or other material that exhibits equivalent or superior ductility at very cold temperatures at least to –30° C. and good toughness at high temperatures at least to 90° C. Other materials such as TPO (Thermoplastic Olefin), TPE (Thermoplastic Elastomer or TEO (Thermoplastic Elastomer Olefin) could be substituted. It is believed that various pieces could be separately formed and joined together to replicate the one piece molded embodiment. If that is done, care will have to be made in order to obtain the energy management that is offered by the integration of the various elements that make up the disclosed structure.

Support base 101 is a generally planar flange that is substantially coplanar with the door support panel 104. As shown in the figures, there is a slight curvature that is intended to correspond to the substrate surface to which the structure 100 attaches. Such a substrate could be curved or perfectly planar. For purposes of this discussion, the support base 101 and the door support panel 104 are described as generally planar to mean that they are configured to be attached to the underside of the substrate 12 that is generally smooth and continuous.

In the depicted embodiment, an alignment slot 137 is provided in an extension from support base 101. Although not shown, the substrate 12 may have a protrusion formed therein and extending from its lower surface to provide a keying feature to assist in the placement of the support structure 100 prior to being welded to the substrate. Apertures 135 on tabs extending from support base 101 are used to perform the same function as alignment slot 137 with protrusions extending from the lower surface of substrate 12.

A test tab extension 139 is shown as having deformable ribs 136 that are identical in content to deformable ribs 118 on support base 101 for attachment to the corresponding lower surface area of the substrate 12 during the same vibration welding process. The test tab extension 139 allows the welding vendor or subsequent customer to perform non-destructive quality control testing by applying a pull pressure to the tab and thereby ensure that the entire weld of the support structure 100 to the substrate is acceptable.

Door support panel 104 and support base 101 are separated by a gap 112 so that door support panel 104 is not directly attached to the support base 101. The support base 101 extends under the pre-weakened door seams 12 and 13 and therefore provides resistance to inward pressures that may be applied to the outer surface of the instrument panel. In the depicted embodiment, several apertures 110 are shown in door support panel 104. Apertures 110 are positioned to reduce the mass of the door support panel 104 without affecting its support or attachment properties.

An air bag chute tube is formed by skirt walls 105 and 108 which extend downward from support base 101. In this embodiment, the air bag chute tube has a rectangular configuration defined by end skirt walls 105 and side skirt walls 108. Angle gussets 127 and 128 are spaced along the skirt walls 105 and 108 to provide added strength and some rigidity between the support base 101 and the air bag chute tube.

A hinge element 200 extends between one of the side skirt walls 108 and hinge edge 107 of door support panel 104. Hinge element 200 includes respective first and second pivoting elements "A" and "B" and an arm extension 103. From the end, it can be seen that the first pivoting element A is formed with a downwardly directed curve having one end connected to the inner side 109 of side skirt wall 108 and the other end connected to said second pivot element B. The second pivot element B is formed with an upwardly directed curve having one end connected to the first pivot element A and the other end connected to extension arm 103. Extension arm 103 extends upwards from second pivot element B to a hinge edge 107 of said door support panel 104. Each pivot element is an axial extension substantially parallel to each other and to the edge of the door panel to which the arm extension 103 is connected. Each pivot element, as well as arm extension 103, extends approximately the full length of the hinge edge 107.

The longer side skirt walls 108 contain several window apertures 114 and 116 for engagement with a corresponding number of attachment hooks 304 and 306 extending from an air bag container 300. Each window aperture 114 and 116 has a tab 115 and 117 that bear against the inserted hooks to tighten the engagement connections and prevent rattling from occurring between the air bag container and the air bag chute during vehicle operation prior to air bag deployment.

The lower portions of the side skirt walls 108, below the windows 114 and 116, contain reinforcement barriers 122 and 124. Reinforcement barriers 122 and 124, in the depicted embodiment, are formed as a doubled thickness of the side skirt wall material and are formed along the entire length of side skirt walls 108. Reinforcement barriers act to prevent hooks 304 and 306 from completely tearing through the side skirt walls from their positions in the windows 114 and 116 when the air bag is deployed. When an air bag is deployed, there is severe pressure initially present within the air bag container and chute. Because the air bag container 300 is fixed to the structure of the vehicle at beam 350, the hooks 304 and 306 prevent separation of the air bag support structure 100 and the instrument panel from their intended locations during air bag deployment. Hooks 304 and 306 interact with side skirt walls 108 below the windows 114 and 116 to contain the pressure and allow the chute to remain intact and direct the pressure to the door support panel 104, which will force rupturing of the tear seams 12 and allow the air bag to deploy. Some prior art applications use metal side walls in air bag chutes to prevent tearing. In the present inventive concept where a thermoplastic material, such as noted above, is molded to form an integrated structure 100, the double thickness reinforcement barriers 122 and 124 function to prevent the hooks from completely tearing through and allowing separation of the air bag support structure.

Figure 5:
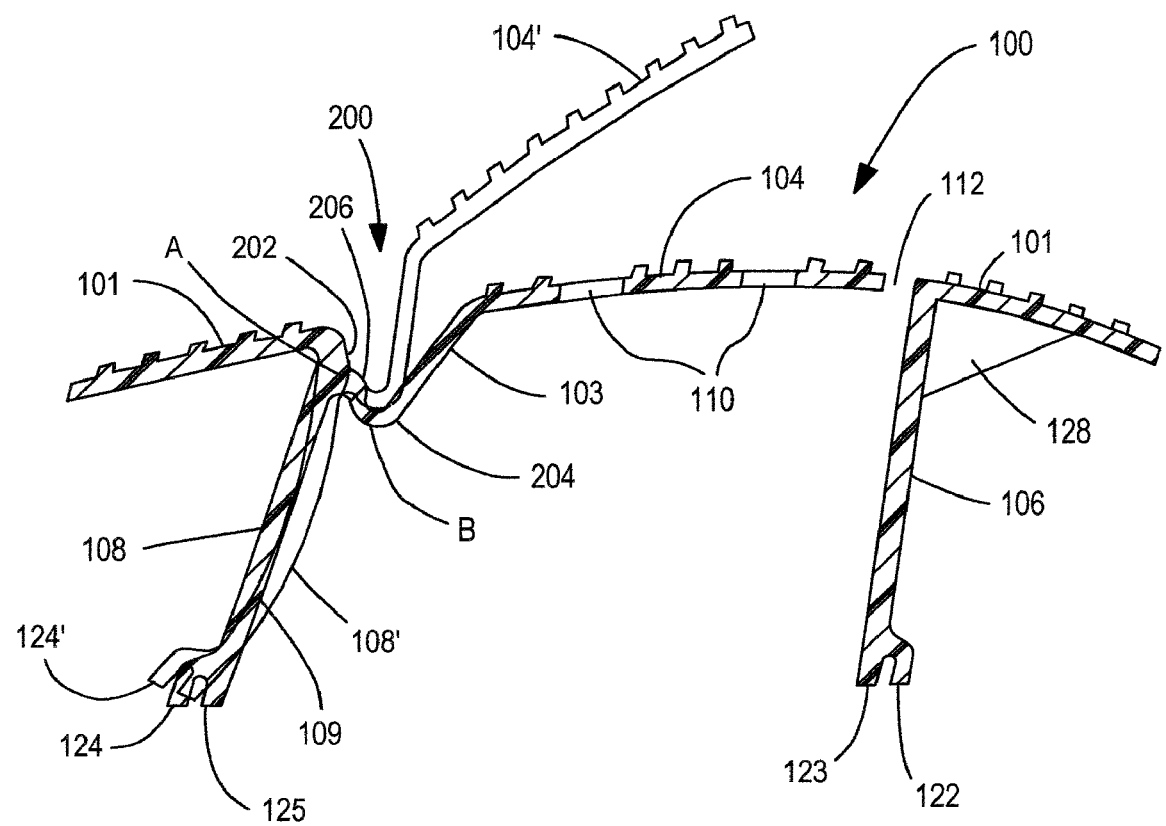
FIG. 5 is a cross-sectional plan view taken along section line 4-4 in FIG. 3 and showing the door section in both a closed and partially opened condition.

In FIG. 5, the energy management effects of the inventive concept are depicted. In the solid line cross-section portion of the drawing, the door support panel 104 is shown in its closed position, as it would normally be when installed in a vehicle and prior to air bag deployment. Upon deployment of the air bag, the forces applied against the underside of door support panel 104 cause the hinge to initially pivot around pivot element A that is attached to the inside surface 109 of side skirt wall 108. As resistance builds a along pivot element A, the door continues to flex open and rotate about pivot point B. When fully open, the door reaches the position indicated as 104' and due to energy dissipation through the hinge and into side skirt wall 108, the side skirt wall flexes inward as 108'.

Because the compound hinge with a plurality of pivot points is connected to the side skirt wall 108 at a position below the lower surfaces of the support base 101 and the door support panel 104, this allows the energy to be transferred into the side skirt wall. It allows a substantial portion of the energy applied against the door support panel 104, following rupture of the tear seams 12, to be dissipated and therefore reduce the potential for having the door support panel become separated during air bag deployment.

It can be seen from the drawings and accompanying explanation, that the present inventive concept is a unique improvement over conventional air bag deployment support structures and methods of managing deployment energy. And while the embodiment shown here is a preferred embodiment, it shall not be considered to be a restriction on the scope of the claims set forth below.

We claim:

1. An air bag deployment structure for use in an air bag deployment system of an automotive vehicle, comprising:
   a support base for attachment to the rear surface of an occupant facing substrate;
   said support base having upper and lower surfaces and being configured to surround a defined air bag deployment door in said substrate;
   a door support panel, having upper and lower surfaces and four side edges, for attachment to said rear surface of said substrate in an area that is pre-weakened to define an air bag deployment door in said substrate; said door support panel is generally co-planar with said support base when attached to said rear substrate surface and all four side edges are separated from said support base along said rear substrate surface;
   an air bag chute extending downward from said support base and containing a plurality of skirt walls for surrounding an air bag container and defining the path for deployment of the air bag from beneath said substrate; and
   a hinge element extending between one of said skirt walls and one edge of said door support panel, including first and second pivoting elements and an arm extension; said first pivoting element being formed as a downwardly directed curve having one end connected to the inner side of one of said skirt walls and the other end connected to said second pivot element, wherein said first pivoting element is formed integrally with said one skirt wall and is formed to be connected to said one skirt wall at a location that is below the lower surfaces of said support base and said door support panel; said second pivot element being formed as an upwardly directed curve having one end connected to said first pivot element and the other end connected to an extension arm, wherein said first and second pivot elements are axial extensions that are substantially parallel to each other, substantially parallel to said one skirt wall, and substantially parallel to said one door support panel edge, and wherein said first and second pivot elements are continuous over a predetermined length that is less than the length of said one door edge; said extension arm extending upwards from said second pivot element to said one edge of said door support panel;
   wherein said hinge element, in combination with said skirt side wall to which it is connected, functions to absorb energy from said air bag deployment forces applied against said door support panel during air bag deployment and cause said skirt side wall to deform inward toward said air bag and thereby decrease the amount of energy that would otherwise be present on said door support panel during air bag deployment.

2. An air bag deployment structure as in claim 1, wherein said support base, said door support panel, said air bag chute and said hinge element are integrally formed in a single molded unit of a thermoplastic material.

3. An air bag deployment structure as in claim 2, wherein said support base and said door support panel contain deformable ribs extending over their upper surfaces and are attached to corresponding rear surface areas of said substrate by a vibration welding process.

4. An air bag deployment structure as in claim 3, wherein said support base includes at least one test tab extension that contains deformable ribs identical in content to said deformable ribs on said support base for attachment to a corresponding lower surface area of said substrate by a vibration welding process to provide non-destructive quality control testing sample for said vibration welding process.

5. An air bag deployment structure as in claim 1, wherein said door support panel contains a plurality of cut out areas to reduce the mass thereof.

6. An air bag deployment structure as in claim 1, wherein said occupant facing substrate is part of a passenger side instrument panel.

7. An air bag deployment structure as in claim 1, wherein said occupant facing substrate is part of a steering wheel air bag deployment module.

* * * * *